United States Patent [19]

Harland

[11] 4,004,546
[45] Jan. 25, 1977

[54] ILLUMINATED INDICATOR GAUGE
[75] Inventor: Philip W. Harland, Perkasie, Pa.
[73] Assignee: Ametek, Inc., New York, N.Y.
[22] Filed: May 2, 1975
[21] Appl. No.: 573,920
[52] U.S. Cl. .................. 116/129 L; 116/129 P; 116/DIG. 5
[51] Int. Cl.² ............... G01D 13/04; G01D 13/22
[58] Field of Search ........ 116/129 L, 129 P, 129 R, 116/DIG. 5, DIG. 35, DIG. 36, 129 F; 240/2.1, 1 EL

[56] References Cited
UNITED STATES PATENTS

| 2,918,034 | 12/1959 | Neugass | 116/129 R |
| 3,503,365 | 3/1970 | Baez et al. | 240/2.1 |
| 3,867,623 | 2/1975 | Widlund | 116/129 L |

OTHER PUBLICATIONS

Besancon, Robert M., *The Encyclopedia of Physics*, Van Nostrand Co., N.Y., pp. 494–497.

*Primary Examiner*—S. Clement Swisher
*Assistant Examiner*—Denis E. Corr

[57] ABSTRACT

An indicator gauge has a flat light conducting prism with an upper beveled surface positioned between the translucent dial and movement of the indicator. The prism receives light from a source located in the rear portion of the gauge and laterally of said movement, such that light is reflected downwardly by the beveled edge through the prism to illuminate the dial and pointer. A second annular prism may also be provided with a beveled surface so as to reflect light from the source across the face of the dial.

6 Claims, 10 Drawing Figures

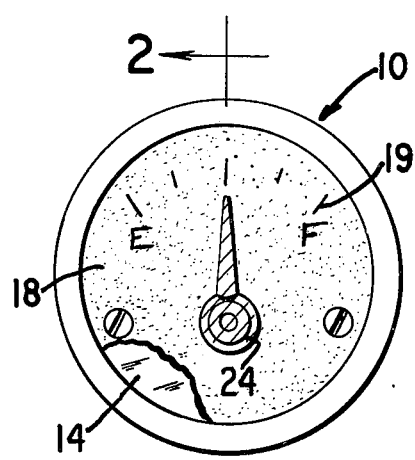
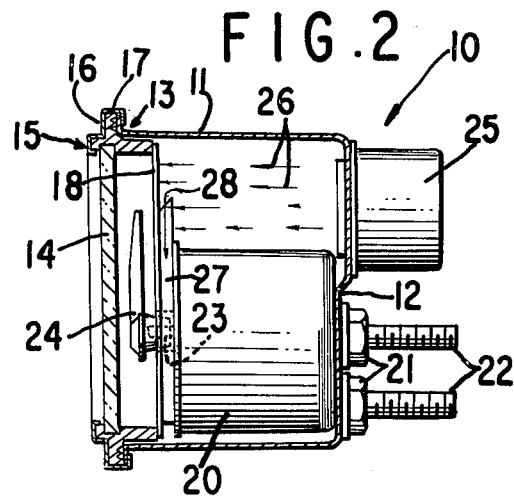
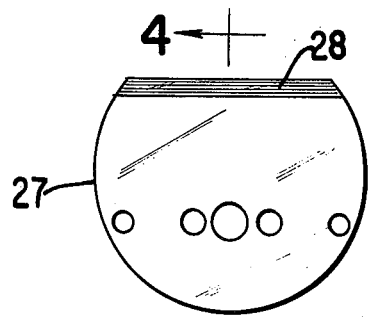
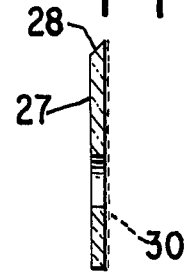
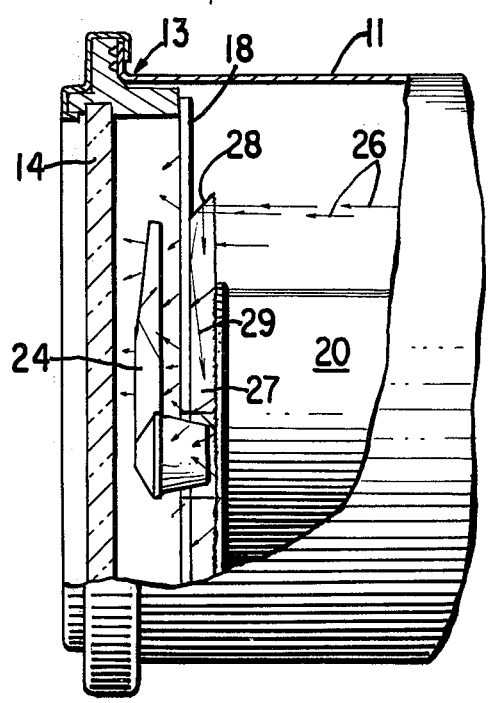

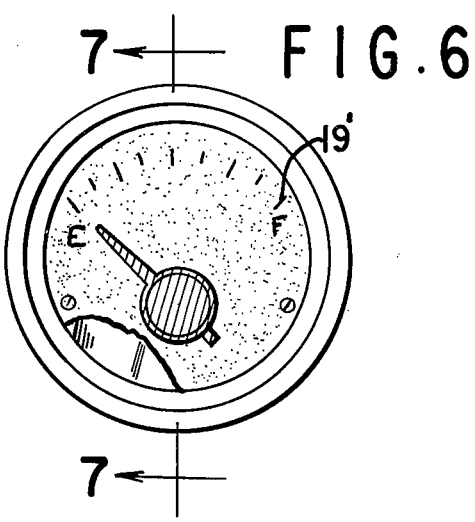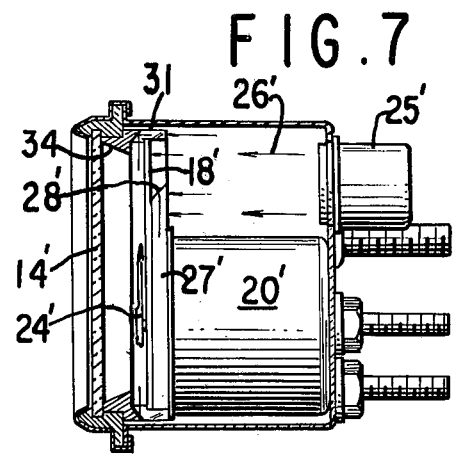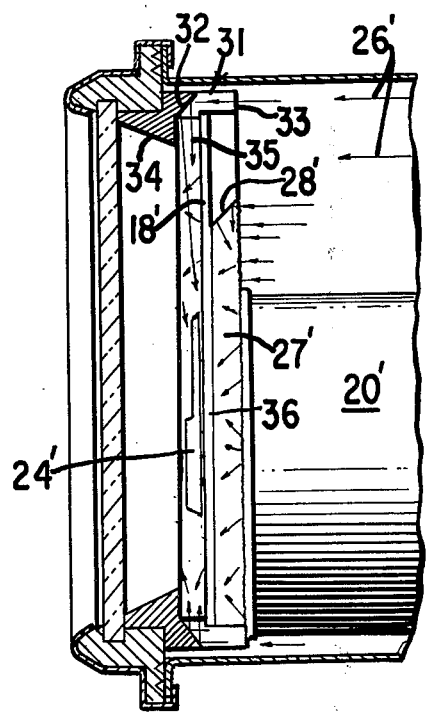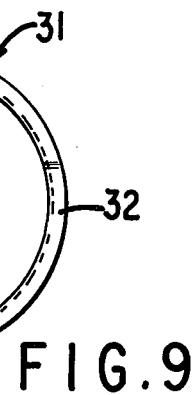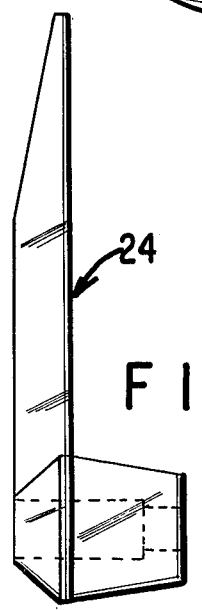

ILLUMINATED INDICATOR GAUGE

The present invention relates to an illuminated indicator gauge, and, more particularly, to such a gauge utilizing one or more light conducting prisms to illuminate the dial and pointer.

Since many indicator gauges are used in surroundings which receive very little light, either naturally or artificially, various arrangements have been made to illuminate such gauges so that they can be easily read. Such gauges are generally provided with their own light sources and the light from the source is directed by a suitable arrangement in such a manner so as to illuminate the indicia on the dial face and to illuminate the position of the indicator pointer. In many types of gauges, such as electrical gauges or instruments, the electrical movement is fastened directly to the rear surface of the dial, so as to block light from the light source from passing through the dial in the area covered by the movement. Thus, a low level lighting exists in this area of the dial which causes difficulties to arise in clearly and quickly reading the dial. This low level lighting has a further disadvantage in that other portions of the dial are illuminated at higher levels. This non-uniform level of lighting across the dial makes it difficult to read accurately.

One of the objects of the invention is to provide an improved lighting arrangement for indicator gauges.

Another of the objects of the present invention is to provide improved illumination of the dial and pointer of an electrical or other type of gauge or instrument.

According to one aspect of the present invention, there is provided an illuminated gauge which may comprise a casing having an open end closed by a viewing window and a translucent dial spaced inwardly of the window. A movement is mounted within the casing inwardly of the dial and is operatively connected to a pointer disposed between the dial and viewing window. The light source is within the casing at the rear portion thereof and is located laterally of the movement. A light conducting prism is disposed between the movement and the dial and has an upper beveled edge surface so that light received from the light source is reflected laterally through the prism by the beveled surface to illuminate the pointer and the underside of the dial.

In a further aspect, an annular second prism may be positioned around the periphery of the dial, said second prism being provided with a beveled surface to reflect light downwardly in front of the dial so as to illuminate the dial and pointer.

Other objects, advantages and features of the present invention will become apparent from the accompanying description and drawings, which are merely exemplary.

In the drawings:

FIG. 1 is a front elevational view of an instrument incorporating the present invention with a portion of the viewing window being cut away;

FIG. 2 is a sectional view taken along the line 2—2 of FIG. 1;

FIG. 3 is a front elevational view of the light conducting prism in the instrument of FIGS. 1 and 2;

FIG. 4 is a sectional view taken along the line 4—4 of FIG. 3;

FIG. 5 is a view similar to that of FIG. 2 but showing only a portion thereof in section and enlarged scale and diagramatically showing the paths followed by the light;

FIG. 6 is a view similar to that of FIG. 1 showing a modification of the present invention;

FIG. 7 is a sectional view taken along the line 7—7 of FIG. 6;

FIG. 8 is a view similar to that of FIG. 7 but only of the front portion thereof and in enlarged scale showing diagramatically the paths of light reflected by the prisms;

FIG. 9 is a elevational view of the annular prism used in the modification of FIGS. 6–8; and FIG. 10 is an enlarged view of a pointer.

Proceeding next to the drawings wherein like reference symbols indicate the same parts throughout the various views, a specific embodiment and modification of the present invention will be described in detail. The invention may be applied to various types of instruments, such as, but not limited to, voltmeters, ammeters, pressure gauges, etc.

As may be seen in FIGS. 1–5, there is generally indicated at 10 an instrument which in the form shown is an electrical indicator which comprises a cylindrical casing 11 having a closed rear end 12 and an open front end 13. The open end 13 is closed by a transparent viewing window 14 retained in position by a gasket or sealing ring 15 which has a portion 16 seated within an annular groove 17 formed adjacent the open end of the casing.

Inwardly of the window 14 is a translucent dial 18 upon which are positioned indicia 19 (FIG. 1) for indicating a predetermined condition. In the embodiment of FIG. 1 and merely as an example, the gauge can be that typical for a fuel level gauge. An electrical movement 20 (FIG. 2) is located in the lower portion of the casing 11 and is mounted on the rear wall 12 by means of nuts 21 threaded upon screws 22 extending from the movement 20 through suitable openings in the rear wall 12.

The movement 20 is operatively connected through a shaft 23 to pointer 24 which is located between the viewing window 14 and dial face 18 so as to move over the dial face adjacent to the scale of indicia 19.

Also mounted in the rear wall 12 of the casing is a light source 25 which emits light rays indicated by the arrows 26. The light source 25 is located in the rear portion of the casing 11 and above or laterally positioned with respect to the movement 20.

Mounted in the space between the dial 18 and front face of the movement 20 is a light conducting prism 27 having an upper beveled edge 28. The prism 27 is positioned in contact with the respective surfaces of the dial 18 and the front face of the movement 20. The prism 27 is shaped so as to cover most of the area of the dial face 18, and the shape of the prism can be best seen in FIG. 3.

The beveled edge 28 is located above the movement 20 so as to be in the path of the light 26 emanating from the light source 25. The beveled edge 28 slopes downwardly toward the dial face, such as shown in FIGS. 2 and 5, so that light rays are reflected downwardly from the beveled edge 28 through the prism as indicated by the arrows 29. The light so reflected lights up that portion of the dial face which is blocked from the light source by the movement 20. If desired, light rays also are deflected outwardly through the dial face 18 so as to illuminate the pointer which can be of plastic. In this form, the light rays are directed toward the base of the pointer so that they will be reflected upwardly or outwardly through the pointer and illuminate the same.

A further advantage of this lighting arrangement is that there is no necessity to slot the electrical gauge housing to provide a space for a light conducting member. Also, the present gauge is less expensive to manufacture over previous designs using molded dials since the dial can now be screened in multiple on a transparent plastic sheet and then blanked.

The rear surface of the prism indicated at 30 has a translucent matte finish. This provides a better lighting effect when the light rays 26 pass through this surface. The dial 18 and the prism 27 can now be fastened directly to movement 20.

The beveled surface 28 of the prism effectively backlights the dial in the area where the movement is attached and where no direct light from the source can enter. Also, as mentioned, the additional light conducted through the prism aids in lighting the plastic rear lighted pointer.

In the modification of FIGS. 6 – 9, a second prism 31 is employed and corresponding elements are indicated by the same numerals with a prime, i.e. 28'. The prism 31 is in the shape of a cylinder having a relatively short axial length and having its front edge beveled at 32. The rear edge of the cylinder 33 is directed toward the light source and receives light indicated by the arrows 26'. Annular prism 31 is retained in position by a suitable sealing ring or bezel 34.

In a manner similar to the gauge of FIGS. 1 to 5, the prism 27' lights the legend and indicia on dial 18'. In addition, beveled surface 32 on the annular prism 31 reflects light downwardly as indicated by the arrow 35 to illuminate the pointer 24'. Thus, this modification provides a separate source of illumination. The prism 27' in this modification is thus employed primarily to illuminate the indicia on the dial 18' although some light will escape from the dial to backlight the pointer 24' as indicated by the arrows 36. Also, the pointer could be similar to that of FIG. 10 but in the form shown in FIGS. 6 to 9, it is not.

Thus, it can be seen that the present invention has provided a simple yet effective structure for the illuminating of an electrical or mechanical gauge utilizing an inexpensive structure. In one embodiment, a prism is used to illuminate both the legend on the dial and the pointer. In the modification, the prism below the dial is used to illuminate primarily the legend on the dial and a second prism is utilized to primarily illuminate the pointer.

Where the terms "upwardly," "upper," or "downwardly" are used herein, such refer especially to the forms shown but include other directions in accordance with positioning of the parts in the casing.

It will be understood that various details of construction and arrangement of parts may be made without departing from the spirit of the invention except as defined in the appended claims.

What is claimed is:

1. In an illuminated indicator instrument, the combination of a casing having an open end closed by a viewing window, a translucent dial spaced inwardly of said window, said dial having indicia thereon, a movement within said casing inwardly of said dial and a pointer between said dial and window operatively connected to said movement, a light source within said casing toward the rear thereof and laterally of said movement, and a light conducting prism between said movement and said dial having a beveled surface at an upper edge thereof spaced from the edge of said dial to receive light directly from said light source, said beveled surface reflecting light transversely therethrough by said beveled surface and a portion of said dial receiving light directly from said source and passing light directly therethrough to illuminate the pointer and dial.

2. In an illuminated indicator instrument as claimed in claim 1 wherein said prism has a shape to cover that portion of the dial in front of and extending upwardly above the movement, the upper beveled surface terminating before the edge of said dial.

3. In an illuminated indicator instrument as claimed in claim 1 wherein said beveled surface slopes toward said dial and said pointer has a light reflective shaft receiving light from said prism and reflecting it to said pointer.

4. In an illuminated indicator instrument as claimed in claim 1 wherein the surface of the prism directed toward the movement has a translucent matte finish.

5. In an illuminated indicator gauge as claimed in claim 1 and an annular second prism around the periphery of said dial and having a second beveled surface thereon to reflect light received from said light source downwardly in front of said dial to primarily illuminate said pointer.

6. In an illuminated indicator gauge as claimed in claim 5 wherein said second prism is cylindrical and said second beveled surface is in front of said dial and is on the end thereof away from said light source and directs light inwardly.

* * * * *